United States Patent
Gross (10) Patent No.: US 6,192,375 B1
(45) Date of Patent: *Feb. 20, 2001

(54) METHOD AND APPARATUS FOR MANAGING FILES IN A STORAGE MEDIUM

(75) Inventor: Mark T. Gross, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/113,810

(22) Filed: Jul. 9, 1998

(51) Int. Cl.[7] .................................................... G06F 17/30
(52) U.S. Cl. .............................. 707/200; 707/1; 707/201; 707/204
(58) Field of Search .................................... 707/200, 201, 707/204, 1

(56) References Cited

U.S. PATENT DOCUMENTS

| 5,724,578 | * | 3/1998 | Morinaga et al. | 707/100 |
| 5,758,154 | * | 5/1998 | Qureshi | 395/651 |
| 5,778,385 | * | 7/1998 | Pratt | 707/200 |
| 5,809,516 | * | 9/1998 | Ukai et al. | 711/114 |
| 5,832,522 | * | 11/1998 | Blickenstaff et al. | 707/204 |
| 5,873,103 | * | 2/1999 | Trede et al. | 707/204 |
| 5,920,873 | * | 7/1999 | Van Huben et al. | 707/202 |

OTHER PUBLICATIONS

Garvon et al., How to use Microsoft Windows NT 4 Workstation, Ziff Davis Press, printed pages labeled 1–2, 1996.*

* cited by examiner

Primary Examiner—Thomas G. Black
Assistant Examiner—Frantz Coby
(74) Attorney, Agent, or Firm—Blakely, Sokoloff, Taylor & Zafman LLP (57) ABSTRACT

A method for managing a storage medium includes searching the storage medium for a first file having a reference to a second file that has moved to a new location on the storage medium. The reference is updated such that it indicates that the second file has moved to the new location.

25 Claims, 5 Drawing Sheets

METHOD AND APPARATUS FOR MANAGING FILES IN A STORAGE MEDIUM

FIELD

The present invention relates to the management of files in a storage medium of a computer system. More specifically, the present invention relates to a method and apparatus for analyzing dependencies of files in the storage medium and updating dependency links so that the movement of a linked file does not reduce the functionality of the file with a dependency.

BACKGROUND

File dependencies exists when a first file requires data from a second file. The first file may be linked to the second file via a registry file that references the second file. Alternatively, the first file may be directly linked to the second file via a reference to the second file in the first file. In situations where files are moved from one location of a storage medium to another, the links between dependent files may be broken when the references are outdated. When the first file is unable to locate the second file, the functionality of the first file may be reduced.

One approach used in the past to prevent breaking links of dependent files while moving files included uninstalling the files from their original locations and reinstalling the files at their new locations. By reinstalling the files, the links between the moved files and the files dependent on the moved files were updated to reflect their current locations. The links to the moved files were updated by writing new references indicating the current locations of the moved files in registries or directly in the dependent files.

One drawback of this approach was that the process of uninstalling and reinstalling files required a fair amount of time. In addition, important data files that were subsequently generated by the files and saved with the files may be inadvertently deleted during the uninstallation process.

SUMMARY

A method for managing a storage medium is disclosed. The storage medium is searched for a first file having a reference to a second file that has moved to a new location on the storage medium. The reference is updated such that it indicates that the second file has moved to the new location.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
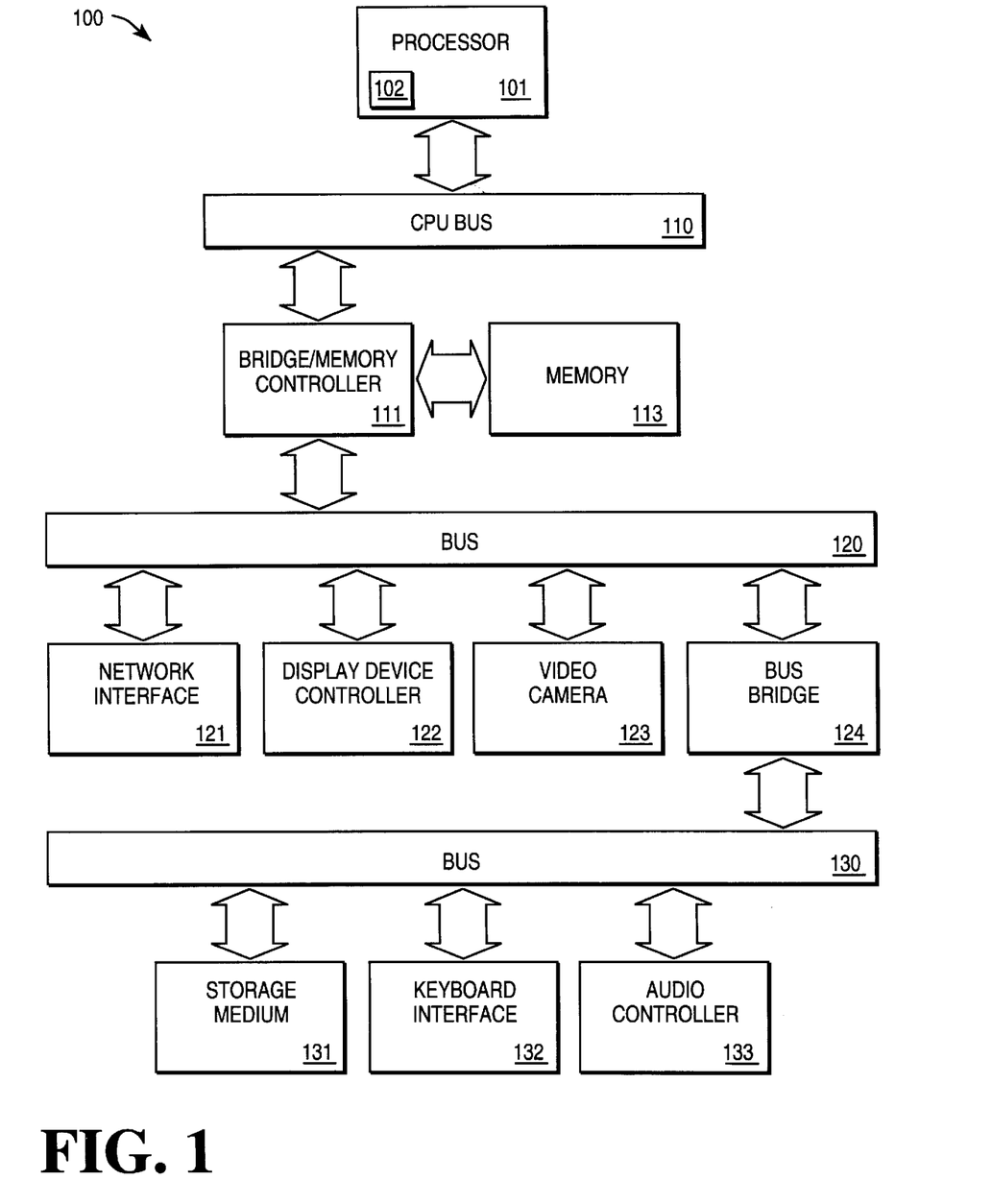
FIG. 1 is a block diagram of a computer system implementing an embodiment of the present invention.

Referring to FIG. 1, a computer system upon which an embodiment of the present invention can be implemented is shown as 100. The computer system 100 includes a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory (DRAM) device, a static random access memory (SRAM) device, or other memory device. The memory 113 may store instructions and code represented by data signals that may be executed by the processor 101. A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge-memory controller 111 is coupled to the CPU bus 110 and the memory 113. The bridge-memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device to the computer system 100 and acts as an interface between the display device and the computer system 100. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100. A video camera 123 is optionally coupled to the first 110 bus 120. The video camera 120 operates to capture an image of an object. The video camera 123 may be a digital video camera having internal digital video capture hardware that translates the captured image into digital graphical data. Alternatively, the video camera 123 may be an analog video camera having digital video capture hardware external to the video camera 123 for digitizing the captured image.

A second I/O bus 130 may be a single bus or a combination of multiple buses. As an example, the second I/O bus 130 may comprise a PCI bus, a PCMCIA bus, a NuBus, an Industry Standard Architecture (ISA) bus, or other buses.

The second I/O bus 130 provides communication links between components in the computer system 100. A storage medium 131 is coupled to the second I/O bus 130. The storage medium 131 may include a data storage device to store data. The data storage device may be a hard disk drive, a floppy disk drive, a CD-ROM device, a flash memory device or other storage device. The storage medium 131 may include one or a plurality of the described data storage devices.

A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. An audio controller 133 is optionally coupled to the second I/O bus 130. The audio controller 133 operates to coordinate the recording and playing of sounds is also coupled to the I/O bus 130.

A bus bridge 124 couples the first I/O bus 120 to the second I/O bus 130. The bus bridge 124 operates to buffer and bridge data signals between the first I/O bus 120 and the second I/O bus 130.

The present invention is related to the use of the computer system 100 to manage files in a storage medium. According to one embodiment, managing files in a storage medium is performed by the computer system 100 in response to the processor 101 executing sequences of instructions in main memory 113. Such instructions may be read into memory 113 from another computer-readable medium, such as data storage device 131, or from another source via the network controller 121. Execution of the sequences of instructions causes the processor 101 to manage files in a storage medium, as will be described hereafter. In an alternative embodiment, hard-wired circuitry may be used in place of or in combination with software instructions to implement the present invention. Thus, the present invention is not limited to any specific combination of hardware circuitry and software.

Figure 2:
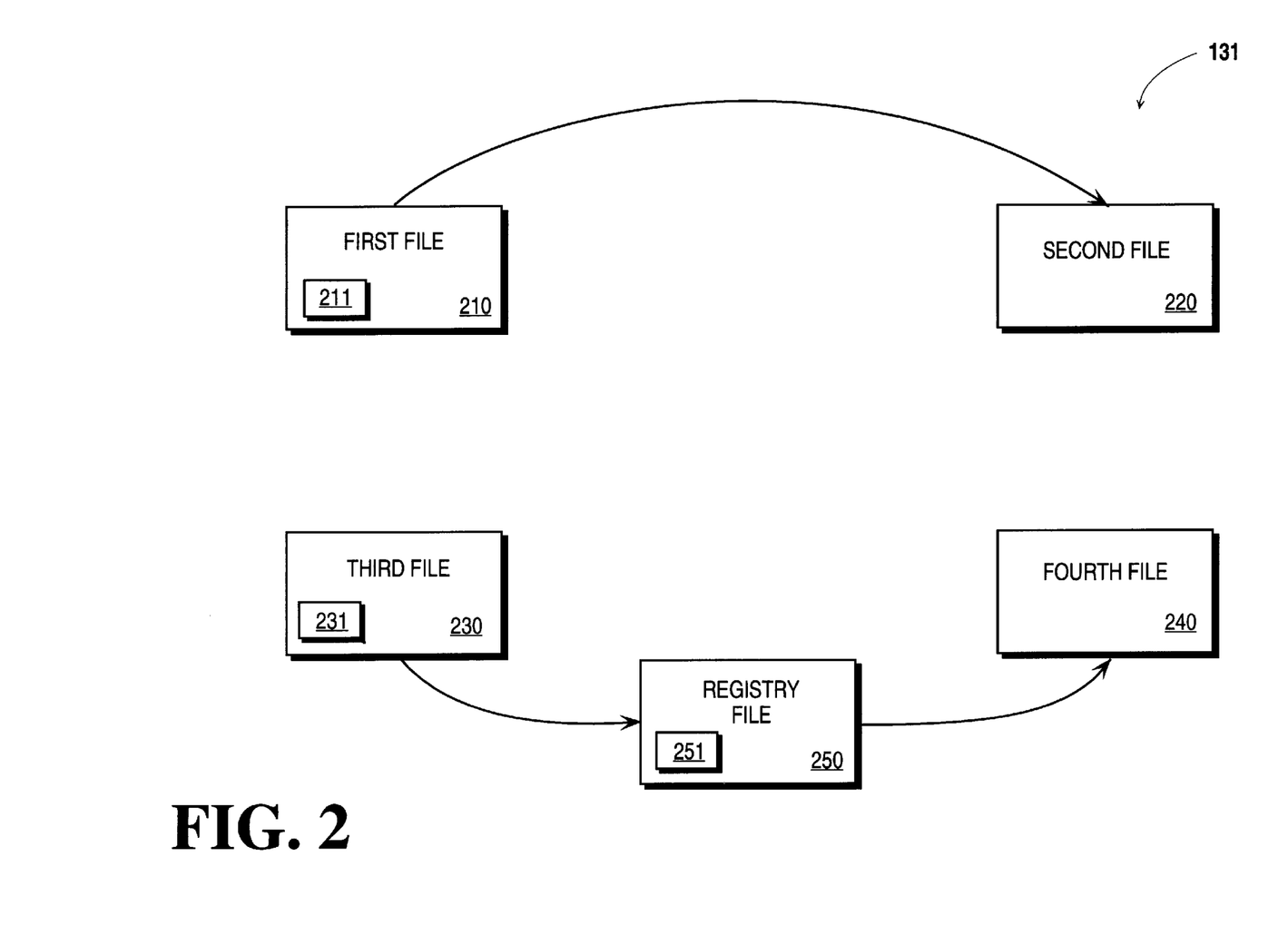
FIG. 2 is a block diagram illustrating properly linked files in a storage medium.

FIG. 2 is a block diagram illustrating properly linked files in a storage medium 131. The storage medium 131 stores a plurality of files 210, 220, 230, 240, and 250. The storage medium 131 includes a first file 210 that has a dependency on a second file 220. The first file 210 includes a reference 211 to the second file 220 that directly links the first file to the second file 220 such that the first file may obtain data from the second file 220. The reference 211 may include a path name that identifies a location of the second file 220.

The first file 210 may be an executable file. An executable file contains data in a format that a processor can directly execute. The first file 210 may include a reference to a second executable file, a dynamic link library file, a data file, or other file. The first file 210 may be a dynamic link library file. A dynamic link library is a library of executable functions or data that can be used by other files. Typically, a dynamic link library file provides one or more particular functions and a file accesses the functions by creating a static or dynamic link to the dynamic link library file. A static link remains constant during a program execution while a dynamic link is created by the program as needed. Dynamic link library files may also contain data. Dynamic link library files typically have a DLL file name extension. The dynamic link library file may include a reference to a second dynamic link library file or other file. The first file 210 may be an initialization file. Initialization files are typically plain-text files that include configuration information. These files are used by other files to save information regarding preferences and operating environment. Initialization files typically have a INI file name extension. Initialization files may include a reference to an executable file, a data file, or other file. The first file 210 may be short cut file. Short cut files are files that generate an icon on a user's desk top. When selected, the short cut executes a program in a file that the short cut is linked to. A short cut file may include a reference to an executable file. Short cut files typically have a program information file (PIF) or a link (LNK) file name extension.

The second file 220 may be a dynamic link library file that is linked to a first file 210 that is a dynamic link library file, executable file, or other file. The second file 220 may be an executable that is linked to a first file 210 that is an executable file, dynamic link library file, initialization file, short cut file, or other file. The second file 210 may be a data file that may be linked to a first file 210 that is an executable file, initialization file, or other file.

The storage medium 131 includes a third file 230 that has a dependency on a fourth file 240. The third file 230 is linked to the fourth file 240 via a registry file 250. A registry file 250 is a data base used by an operating system to store configuration information, file content, and file location information. The registry file 250 includes a path name file 251 that stores the file location information. The third file 230 includes a reference to a global unique identifier (GUID) 231 that identifies data required by the third file 230. The data may be a function in a dynamic link library file, executable file, a data file, or other data. A GUID is used by an operating system to associate a file to the required data. The operating system searches the registry file 250 and links the file having the data to the third file 230. The operating system is able to link the file with the data with the third file 230 because the registry file 250 includes file location information of the file with data, such as its path name. According to FIG. 2, the fourth file 240 has the data and is linked to the third file 230 via the registry 250.

The third file 230 may be a dynamic link library file, executable file, or other file. The fourth file may be a dynamic link library file that is linked to a third file that is a dynamic link library file, an executable file, or other file. The fourth file 240 may be an executable file that is linked to a dynamic link library file, executable file, or other file. The fourth file 240 may be a data file that is linked to a dynamic link library file, an executable file, or other file.

Figure 3:
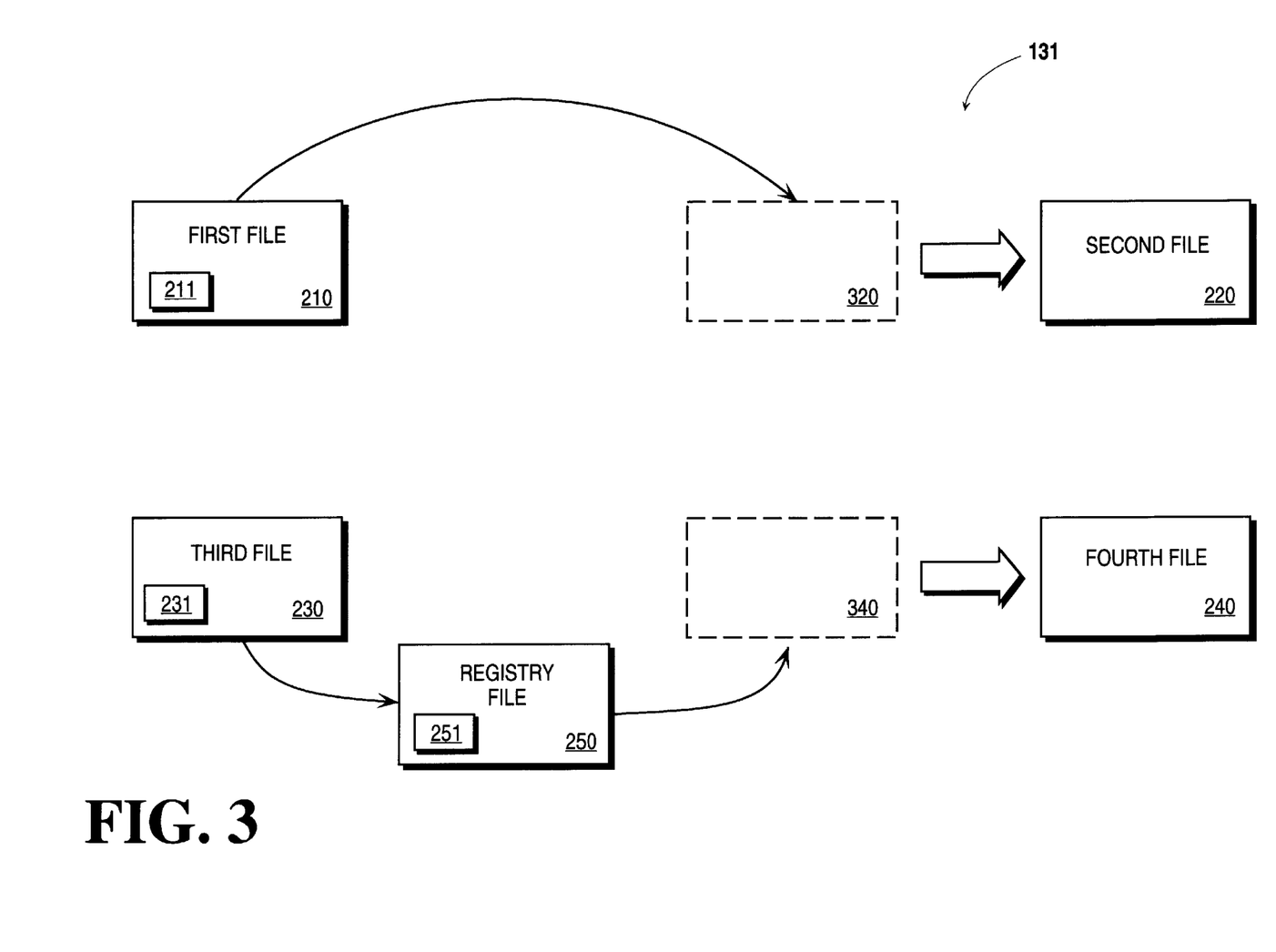
FIG. 3 is a block diagram illustrating files in a storage medium that have links that are broken.

FIG. 3 is a block diagram that illustrates files with broken links. When data files are moved within a storage medium, the files are given new path names. Unless the path name of a moved file is updated in a file that is dependent on the moved file or in a registry responsible for linking the moved file, the link to the moved file will be broken. FIG. 3 illustrates the files shown in FIG. 2, where the second file 220 has moved to a new location in the storage medium 131. The new location in the storage medium 131 may be, for example, a new drive location or a new directory where the second file 220 is given a new path name. The first file 210 includes a reference 211 to the old location, illustrated with block 320, of the second file 220. Thus, when the first file 210 attempts to access data from the second file 220, the first file 210 will be unable to interface with the second file 220.

FIG. 3 illustrates the fourth file 240 moved to a new location in the storage medium 131. The new location in the storage medium 131 may be for example a new drive location or a new directory where the fourth file 240 is given a new path name. The registry file 250 includes a path name file 251 that includes a reference to the old location, illustrated with block 340, of the fourth file 240. Thus, when an operating system attempts to link the third file 230 with the fourth file 240 to allow the third file 230 to access data from the fourth file 240, the third file 230 will be unable to interface with the fourth file 240.

Figure 4:
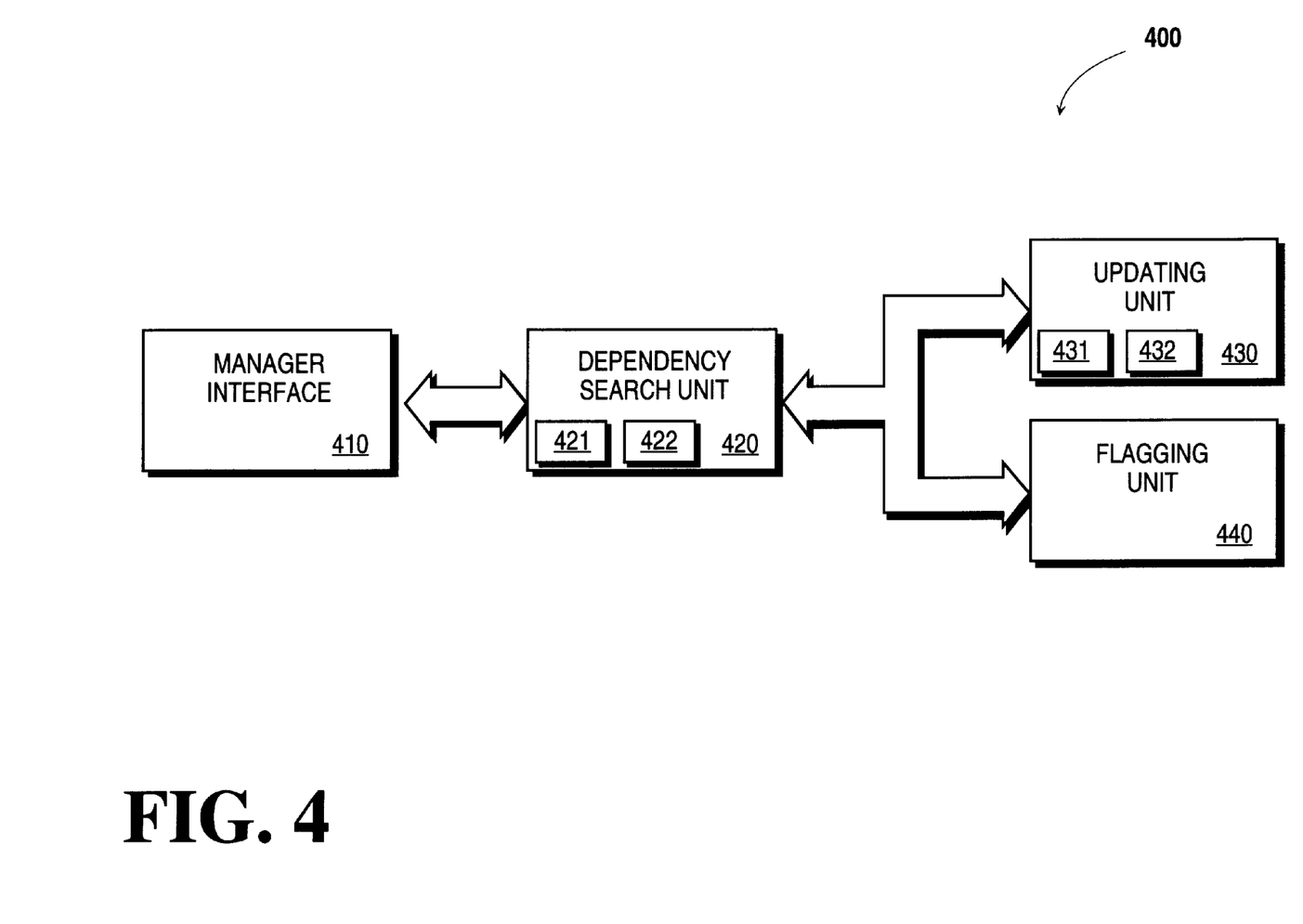
FIG. 4 is a block diagram of a link updating unit according to an embodiment of the present invention.

FIG. 4 is a block diagram that illustrates modules that implement a storage medium manager 400 according to an embodiment of the present invention. In an embodiment of the present invention, the modules are implemented by software and reside in the storage medium 113 (shown in FIG. 1) as a sequence of instructions. It should be appreciated that the modules may also be implemented by hardware as components coupled to the bus 120 (shown in FIG. 1) or a combination of both hardware and software.

Block 410 represents a manager interface. The manager interface 410 obtains the identity of a file that has been moved from one location in the storage medium 131 (shown in FIG. 1) to another. According to an embodiment of the present invention, the manager interface 410 may obtain this information directly from an operating system of the computer system 100. According to an alternate embodiment of the present invention, the manager interface 410 may include a user interface that allows a user to identify a file the user is moving from one location on the storage medium to another. The identity of the file may be a path name of the file which may include the drive and any directory and sub-directory the file is stored in, the name of the file, and an extension of the file.

A dependency search unit 420 is coupled to the manager interface 410. The dependency search unit 420 receives the identity of the file that has moved from the manager interface 410. The dependency search unit 420 searches the storage medium 131 for the identity of any file that is dependent on the file that has moved and is linked to the previous location of the filed that has moved. The dependency search unit 420 searches the storage medium 131 for any file that references the file that has moved. The reference provides a dependency link to the moved file. The dependency search unit 420 includes a registry file interface 421. The registry file interface 421 searches a registry file in the storage medium 131 for a reference to the moved file. The registry file interface 421 accesses a path name file in the registry file that stores file location information, such as the path name, of files that are referenced by the registry file. The registry file may reference a moved file that may include, for example, an executable file, dynamic link library file, data file, an application specific data file, or other file. The dependency search unit 420 includes a file interface 422. The file interface 422 searches non-registry files in the storage medium 131 for a reference to the moved file. The reference provides a dependency link to the moved file. The file interface 422 accesses all non-registry files on the storage medium 131 and searches the non-registry files for a reference, such as the path name, of the moved file. The non-registry files that may be accessed include dynamic link library files, executable files, initialization files, short cut files, and data files. The non-registry files may reference a moved file that may include, for example, an executable file, dynamic link library file, data file, application specific data file, or other file. When the registry interface 421 or the file interface 422 finds a reference to a moved file in an application specific data file, the file interface 422 recognizes that this is a file that is non-updatable.

An updating unit 430 is coupled to the dependency search unit 420. The updating unit 430 receives the identity of an updatable file that is dependent on the moved file. The updating unit 430 updates the reference of the moved file in the file dependent on the moved file. The updating unit 430 includes a path writing unit 431. The path writing unit 431 overwrites an old path name of the moved file with the new path name that reflects the new location of the moved file. According to an embodiment of the present invention, the path writing unit 431 overwrites old path names of moved files referenced in registry files, initialization files, and other files. The updating unit 430 includes a path updating unit 432. The path updating unit 432 updates a search path in a file that is dependent on a moved file to include the new path name of the moved file. According to an embodiment of the present invention, the path updating unit 432 updates search paths of moved files referenced in dynamic link library files, short cut files, and other files.

A flagging unit 440 is coupled to the dependency search unit 420. The flagging unit 440 receives the identity of non-updatable files that reference the moved file. Application specific data files and files that reference application specific data files are typically written in a proprietary data format that makes updating of the files problematic. In order to prevent a file from referencing an updated path name of an application specific data file, the flagging unit 440 returns the moved file back to its original location and notifies the user. According to an alternate embodiment of the present invention, the flagging unit 440 notifies the user of the broken link without returning the moved file to its original location.

The manager interface 410, dependency search unit 430, registry interface 421, file interface 422, updating unit 430, path writing unit 431, path updating unit 432, and flagging unit 440 may be implemented using any known circuitry or any known technique. In an embodiment of the present invention where the storage medium manager 400 is implemented in hardware, the dependency search unit 420, registry interface 421, file interface 422, updating unit 430, path writing unit 431, path updating unit 432, and flagging unit 440 all reside on a single silicon substrate.

Figure 5:
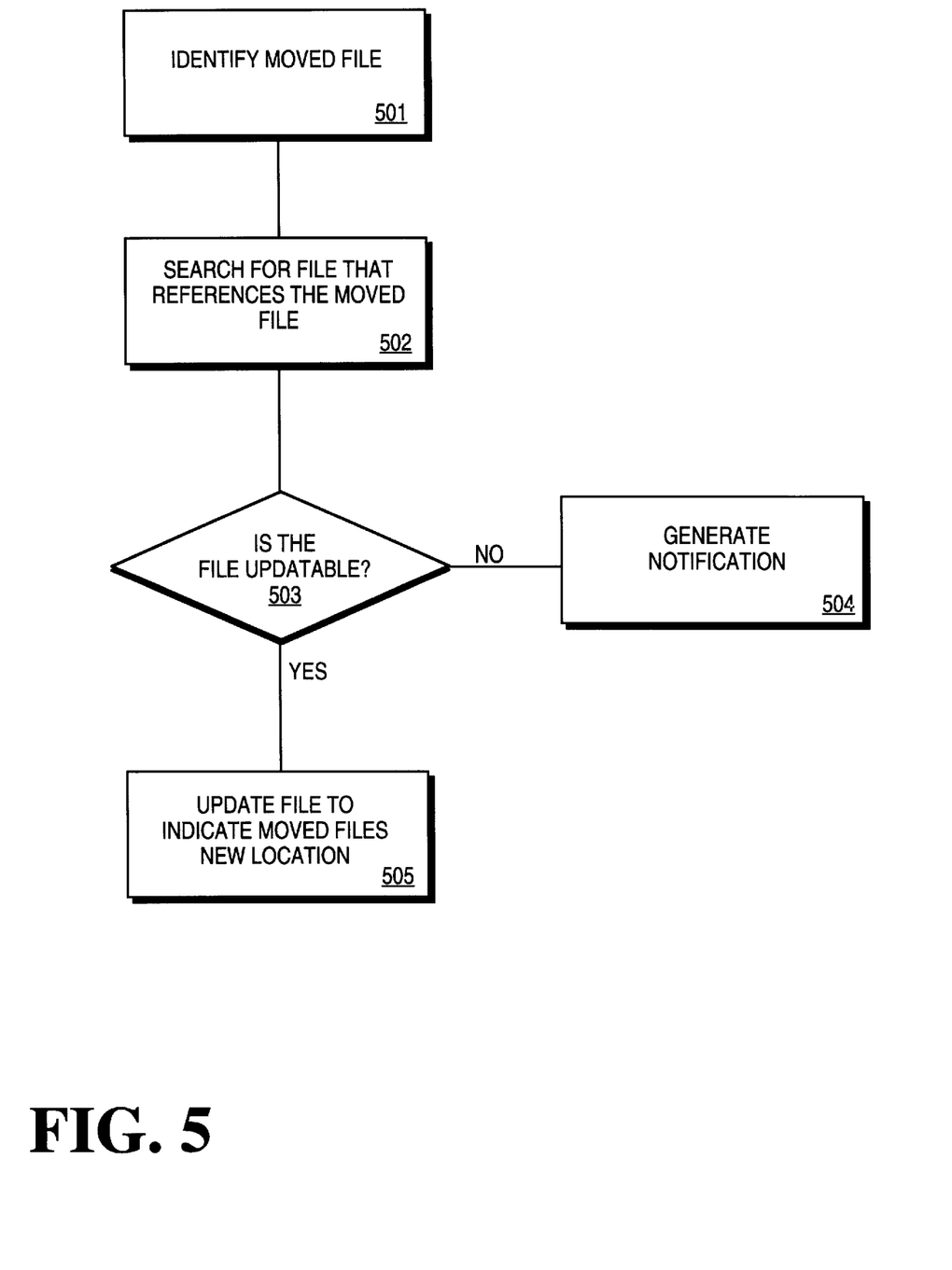
FIG. 5 is a flow chart illustrating a method for managing files on a storage medium according to an embodiment of the present invention.

FIG. 5 is a flow chart that illustrates a method for managing a storage medium according to an embodiment of the present invention. At step 501, a file that has moved from a first location to a second location on the storage medium is identified. According to an embodiment of the present invention, the moved file may be identified by an operating system or a user of the computer system.

At step 502, the storage medium is searched for a first file having a reference to the moved second file. According to an embodiment of the present invention, registry files and non-registry files are searched for a reference to the second file. The reference to the second file may be a path name of the second file. The non-registry files searched may include dynamic link library files, executable files, data files, initialization files, short cut files, or other files.

At step 503, it is determined whether the first file that references the moved second file is an updatable file. If the first file is an updatable file, control proceeds to step 505. If the first file is a non-updatable file, control proceeds to step 504. According to an embodiment of the present invention, files that reference an application specific data files are files that are non-updatable.

At step 504, notification is sent to indicate that a broken link exists between the first file and the moved second file. According to an embodiment of the present invention, the moved second file is returned to its first location.

At step 505, the reference in the first file is updated such that it indicates that the second file has moved to the second location. According to an embodiment of the present invention, updating the reference may be achieved by updating a search path for the second file or overwriting the reference to the second file with its new path name.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A method for managing a storage medium, comprising:
    searching the storage medium for a first file containing one of executable code and data, the first file also having a reference included within the first file to a second file containing one of executable code and data, the second file having moved to a new location on the storage medium, wherein the reference is a search path to a location on the storage medium where the second file resides; and
    updating the reference included in the first file such that it indicates that the second file has moved to the new location, wherein the updated reference is a new search path to a location on the storage medium where the second file has moved.

2. The method of claim 1, wherein the step of searching the storage medium for the first file having the reference to the second file comprises searching a registry file for a path name of the second file.

3. The method of claim 1, wherein the step of searching the storage medium for the first file having the reference to the second file comprises searching non-registry files stored on the storage medium for a path name of the second file.

4. The method of claim 3, wherein searching non-registry files stored on the storage medium comprises searching initialization files.

5. The method of claim 3, wherein searching non-registry files stored on the storage medium comprises searching dynamic link library files.

6. The method of claim 3, wherein searching non-registry files stored on the storage medium comprises searching program information files.

7. The method of claim 3, wherein searching non-registry files stored on the storage medium comprises searching executable files.

8. The method of claim 3, wherein searching non-registry files stored on the storage medium comprises searching data files.

9. The method of claim 1, wherein the step of updating the reference comprises replacing the reference to the second file with a new reference to the second file reflecting the new location of the file.

10. The method of claim 1, further comprising the step of generating a notification when the first file is a non-updatable file.

11. A computer-readable medium having a sequence of instructions stored thereon, the sequence of instructions, when executed by a processor, causes the processor to perform the steps of:
    searching a storage medium for a first file containing one of executable code and data, the first file also having a reference included within the first file to a second file containing one of executable code and data, the second file having moved to a new location on the storage medium, wherein the reference is a search path to a location on the storage medium where the second file resides; and
    updating the reference included in the first file such that it indicates that the second file has moved to the new location, wherein the updated reference is a new search path to a location on the storage medium where the second file has moved.

12. The computer-readable medium of claim 11, wherein the sequence of instructions that cause the processor to search the storage medium for the first file having the reference to the second file comprises instructions that cause the processor to perform the step of searching a registry file for a path name of the second file.

13. The computer-readable medium of claim 11, wherein the sequence of instructions that cause the processor to search the storage medium for the first file having the reference to the second file comprises instructions that cause the processor to search non-registry files stored on the storage medium for a path name of the second file.

14. The computer-readable medium of claim 11, wherein the sequence of instructions that cause the processor to update the reference comprises instructions that cause the processor to replace the reference to the second file with a new reference to the second file reflecting the new location of the file.

15. The computer-readable medium of claim 11, further comprising instructions which when executed by the processor causes the processor to perform the step of generating a notification when the first file is a non-updatable file.

16. A storage medium manager, comprising:
    a dependency search unit that searches a storage medium for a first file containing one of executable code and data, the first file also having a reference included within the first file to a specified second file containing one of executable code and data, wherein the reference is a search path to a location on the storage medium where the second file resides; and
    an updating unit, coupled to the dependency search unit, that updates the reference included in the first file to the specified second file, wherein the updated reference is a new search path to a location on the storage medium where the second file has moved.

17. The storage medium manager of claim 16, wherein the dependency search unit comprises a registry file interface that searches a registry file in the storage medium for a path name of the specified second file.

18. The storage medium manager of claim 16, wherein the dependency search unit comprises a file interface that searches non-registry files in the storage medium for a path name of the specified second file.

19. The storage medium manager of claim 16, wherein the updating unit includes a path updating unit that adds a new reference to the specified second file.

20. The storage medium manager of claim 16, wherein the updating unit includes a path writing unit that overwrites the reference to the specified second file with a new reference to the specified file.

21. The storage medium of claim 16, further comprising a flagging unit, coupled to the dependency search unit, that generates a notification when the first file is a non-updatable file.

22. A computer system, comprising:
    a bus;
    a processor coupled to the bus;
    a storage medium coupled to the bus;
    a storage medium manager, coupled to the bus, that includes a dependency search unit that searches the storage medium for a first file containing one of executable code and data, the first file also having a reference included within the first file to a specified second file containing one of executable code and data, wherein the reference is a search path to a location on the storage medium where the second file resides, and an updating unit, coupled to the dependency search unit, that updates the reference included in the first file to the specified second file, wherein the updated reference is a new search path to a location on the storage medium where the second file has moved.

23. The computer system of claim 22, wherein the dependency search unit comprises a registry file interface that searches a registry file in the storage medium for a path name of the specified second file.

24. The computer system claim 22, wherein the dependency search unit comprises a file interface that searches non-registry files in the storage medium for a path name of the specified second file.

25. The computer system of claim 22, further comprising a flagging unit, coupled to the dependency search unit, that generates a notification when the first file is a non-updatable file.

* * * * *

UNITED STATES PATENT AND TRADEMARK OFFICE
CERTIFICATE OF CORRECTION

PATENT NO.    : 6,192,375 B1                                    Page 1 of 1
DATED         : February 20, 2001
INVENTOR(S)   : Gross It is certified that error appears in the above-identified patent and that said Letters Patent is hereby corrected as shown below:

Column 2,
Line 56, delete "110", insert -- I/O --.

Signed and Sealed this

Fourth Day of March, 2003

JAMES E. ROGAN
*Director of the United States Patent and Trademark Office*